(12) United States Patent  (10) Patent No.: US 8,557,410 B2
Matsumoto et al.  (45) Date of Patent: Oct. 15, 2013

(54) SECONDARY BATTERY WITH A SPIRALLY-ROLLED ELECTRODE GROUP

(75) Inventors: Isao Matsumoto, Osaka (JP); Hua Zhou, Osaka (JP); Koji Kuwana, Osaka (JP)

(73) Assignee: M&G Eco-Battery Co., Ltd., Osaka-shi (JP)

( * ) Notice: Subject to any disclaimer, the term of this patent is extended or adjusted under 35 U.S.C. 154(b) by 955 days.

(21) Appl. No.: 12/550,637

(22) Filed: Aug. 31, 2009

(65) Prior Publication Data

US 2010/0055548 A1 Mar. 4, 2010

(30) Foreign Application Priority Data

Sep. 2, 2008 (JP) .................................. 2008-224494

(51) Int. Cl.
*H01M 10/00* (2006.01)
*H01M 10/02* (2006.01)
*H01M 10/04* (2006.01)

(52) U.S. Cl.
USPC ................. 429/7; 429/94; 429/164; 429/161; 429/66

(58) Field of Classification Search
USPC ..................... 429/94, 169, 170, 175, 186, 164
See application file for complete search history.

(56) References Cited

U.S. PATENT DOCUMENTS

| 5,521,021 | A | 5/1996 | Alexandres et al. | |
| 6,333,124 | B1* | 12/2001 | Moriwaki et al. | 429/176 |
| 2001/0036571 | A1* | 11/2001 | Oogami et al. | 429/94 |
| 2002/0168565 | A1 | 11/2002 | LeBouchard et al. | |
| 2005/0271933 | A1* | 12/2005 | Matsumoto et al. | 429/127 |
| 2006/0078787 | A1* | 4/2006 | Sato et al. | 429/62 |
| 2007/0141449 | A1* | 6/2007 | Kim | 429/66 |
| 2007/0160904 | A1* | 7/2007 | Uh | 429/174 |
| 2009/0208830 | A1 | 8/2009 | Okabe et al. | |

FOREIGN PATENT DOCUMENTS

| DE | 3019186 A1 | 11/1981 |
| JP | 6036756 A | 2/1994 |
| JP | 11102689 A | 4/1999 |
| JP | 2002198055 A | 7/2002 |
| JP | 2006012801 A | 1/2006 |
| WO | 2006129778 A1 | 12/2006 |

OTHER PUBLICATIONS

Kitaoka, Kazuhiro et al, "Nickel-Metal Hydride Batteries for Hybrid Electric Vehicles (HEVs)", Sanyo Technical Review, Dec. 2004, pp. 20-26, vol. 36, No. 2.
Ohtani, Yoshikatsu et al., "Development of Next-generation High Power Cylindrical Nickel-Metal Hybride Battery "Prothium(tm)" for Hybrid Electric Vehicles", GS Yuasa Technical Report, 2007, pp. 41-48, GS Yuasa Corporation.

* cited by examiner

*Primary Examiner* — Basia Ridley
*Assistant Examiner* — Caitlin Wilmot
(74) *Attorney, Agent, or Firm* — The Webb Law Firm (57) ABSTRACT

An electrode group E in which a positive electrode 1 and a negative electrode 2 are spirally-rolled interposing a separator 3 is contained in a bottomed cylindrical can 4. A metal exposure portion 1a provided on an end surface of the positive electrode 1 of the electrode group E or a metal-made current collecting plate 9 electrically connected to the metal exposure portion 1a (called a current collecting portion of a positive electrode) and a cover body 8 also functioning as a positive electrode terminal are electrically connected by a metal lead plate 5. One or more electrolyte resistant metal pressers 10 are arranged and electrically connected between the current collecting portion of the positive electrode and the cover body 8. The electrode group E is applied pressure by the cover body 8 and the bottom portion 4a of the bottomed cylindrical can 4.

14 Claims, 6 Drawing Sheets

SECONDARY BATTERY WITH A SPIRALLY-ROLLED ELECTRODE GROUP

CROSS-REFERENCE TO RELATED APPLICATION

This application claims the benefit of priority based on Japanese Patent Application No. 2008-224494, the entire same contents of which are incorporated by reference herein.

BACKGROUND OF THE INVENTION

1. Field of the Invention

The present invention relates to a secondary battery with improved internal impedance having a spirally-rolled electrode group and in particular, the present invention relates to a secondary battery for high-rate discharge.

2. Description of the Prior Art

In recent years, for the purpose of mitigating global environmental issues and energy issues, introducing hybrid electric vehicles (HEV) and electric vehicles (EV) and expanding the market share thereof has been drawing attention as effective means for saving oil consumption to about a half. In particular, HEV having already been put into practical use, presently, with nickel-hydrogen batteries (Ni/MH batteries) mounted, are expanding its market rapidly. Further, with a view to mounting to the HEV with expanding market, not only improving the characteristics of Ni/MH batteries but also motivation of developing the lithium secondary batteries is strong.

Since the HEV and EV are under harsh conditions in which many batteries are connected in series and they are exposed to broadly ranged temperature, vibration and the like, much more improved reliability than the conventional HEV and EV is required and further, at the same time, improvement in high-rate discharge of the batteries or powering up is also required for the purpose of enhancing the performance of HEV themselves.

The present application suggests with a view to powering up secondary batteries using the spirally-rolled electrode group and to be specific, it provides the means to improve the internal impedance of the batteries. In addition, although the present application is extremely effective for secondary batteries for HEV that particularly require power, it is also effective for powering up generally used small-sized secondary batteries using a spirally-rolled electrode group. Then, for the convenience of explanation, a cylindrical sealed Ni/MH battery using a spirally-rolled electrode group having already been put into practical use as a power source for HEV is taken as one example, and the explanation thereof is hereinafter made in detail. Here, this Ni/MH battery refers to an 1.2 V alkaline secondary battery in which a nickel electrode using nickel oxide powder is used as a positive electrode, a negative electrode using hydrogen absorbing alloy powder is used as a negative electrode, and a porous non-woven cloth of a synthetic fiber is used as a separator.

Basically, a battery structure for power applications in Ni/MH batteries developed and put into use around 1990s employs the similar structure to existing Ni/Cd batteries. In other words, basically, the battery structure for power applications in Ni/MH batteries employs such a structure that the electrode group with a positive electrode and a negative electrode spirally-rolled interposing a separator therebetween contained in a bottomed cylindrical can and metal-made current collecting plates covering each metal exposure portion provided on each end surface of the positive electrode and the negative electrode of the electrode group are welded at multiple contact points, and in the positive electrode side, the metal-made current collecting plate and a cover body that also functions as a positive terminal are welded with the electrode lead plate thereby electrically connected, while in the negative electrode side, the metal-made current collecting plate contacts with a bottom portion of the bottomed cylindrical can or some parts are welded thereby electrically connected.

However, for the applications that require ultra-high rate discharge as in the recent batteries for the HEV, such improvement mentioned as follows are suggested by many battery manufacturers in order to reduce internal impedance of the batteries.

The impedance of the metal lead plate that connects the positive electrode and the cover body is reduced by processing the shape of the metal lead plate into thick, wide, and/or short scaled (prior art 1).

The impedance of the metal lead plate is reduced by preparing the two metal lead plates (prior art 2).

As an improvement of the prior art 2, a cylindrical metal work piece is employed instead of using the metal lead plate, and after pouring electrolyte, the work piece is welded to the cover body and the positive electrode by applying current between the positive and the negative electrodes held with the cover body (non-patent document 1: "SANYO TECHNICAL REVIEW, VOl. 36, No. 2, P 20, December 2004").

Separately, as another improvement of the prior art 2, a metal work piece in which one side is processed into petal-like instead of using the metal lead plate is employed. In other words, the impedance of the metal work piece that corresponds to the metal lead plate is reduced by making the work piece contact with the cover body at multiple contact points and after pouring electrolyte, weld the cover body and the petal-like protrusion by applying current between the positive and negative electrodes (non-patent document 2: "GS Yuasa Technical Report, Vol. 4, No. 2, P 41, 2007").

As mentioned above, in order to reduce the internal impedance of the batteries, many cases are reported on improvements of the metal lead plate that mainly connects the positive electrode and the cover body.

SUMMARY OF THE INVENTION

In the battery with the spirally-rolled electrode group, although in general, the negative electrode contacts with the bottomed cylindrical can that also functions as the negative electrode terminal, since the positive electrode is only connected to the cover body that also functions as the positive electrode terminal by the metal lead plate, the above mentioned improvement in the metal lead plate is indeed effective for reducing the internal impedance of the battery.

However, the non-patent document 1 has problems that with the thick metal lead, bending becomes difficult in inserting the cover body to the bottomed cylindrical can, with the wide metal lead, there lies a risk of short circuit caused by contacting with the can, and with the short scaled metal lead, spot welding with the cover body becomes difficult and the like and defective rate increases during mass production. In other words, considering the above, the lead under the present status has progressed to the limit of the thickness, width, and short scale.

The prior art 2 also has problems that the metal lead plate contacts with the can thereby generating the risk of short circuit when the cover body that is welded and connected to the two metal lead plates is inserted in the can, and the defective rate increases during mass production.

The non-patent documents 1 and 2 also have problems similar to those of the prior art 2 although the impedance can greatly be reduced and they also have problems that the electrolyte spews out due to heating or the welding becomes uneven when high current of pulse or AC flows is applied to the battery after sealing with the cover body.

Therefore, the new structure method of the positive lead or the one corresponding to the positive lead is required that would solve the above mentioned problems as well as to reduce the impedance of the parts that connects the cover body and the positive electrode. Here, it is naturally preferable that no concern arises that would degrade the reliability such as micro short circuit and the like generated at the time of contacting the cans or at the time of constituting the batteries and also, it is naturally preferable that the complicated processes can be omitted such as an adjustment for applying high current.

The present invention relates both to generally used D-sized batteries and Cs-sized batteries and to the batteries with improved reliability (Japan unexamined laid-open patent publication 2006-12801) of preventing micro short circuit caused by the falling-off of the active material powders by bending the metal exposure portion provided at the end surface of the positive and negative electrode of the electrode group together with the separator to make it bag-like as already suggested by the inventors, and the present invention provides the structure with improved power characteristics of these.

To be specific, between the cover body and the electrode group, other than connecting the conventional metal lead plate, one or more independent metal pressers with electrolyte resistance are arranged, directly connecting the cover body and the electrode group at multiple contact points. Also, since it has been found that pressurizing the electrode group at the cover body and the bottom portion of the can is effective for reducing the impedance, the above mentioned metal pressers are arranged so that it can press the entire electrode group and the structure that pressurizes the entire electrode group at the cover body and the bottom portion of the can is employed.

For information, in accordance with this, the lead of the negative electrode that is in the opposite side to the lead of the positive electrode of the electrode group also receives the pressure, the structure is made to be flexible to receive the pressure and the process is made to be simple so that it can remove the necessity of welding to the can.

DESCRIPTION OF THE PREFERRED EMBODIMENTS

Figure 1:
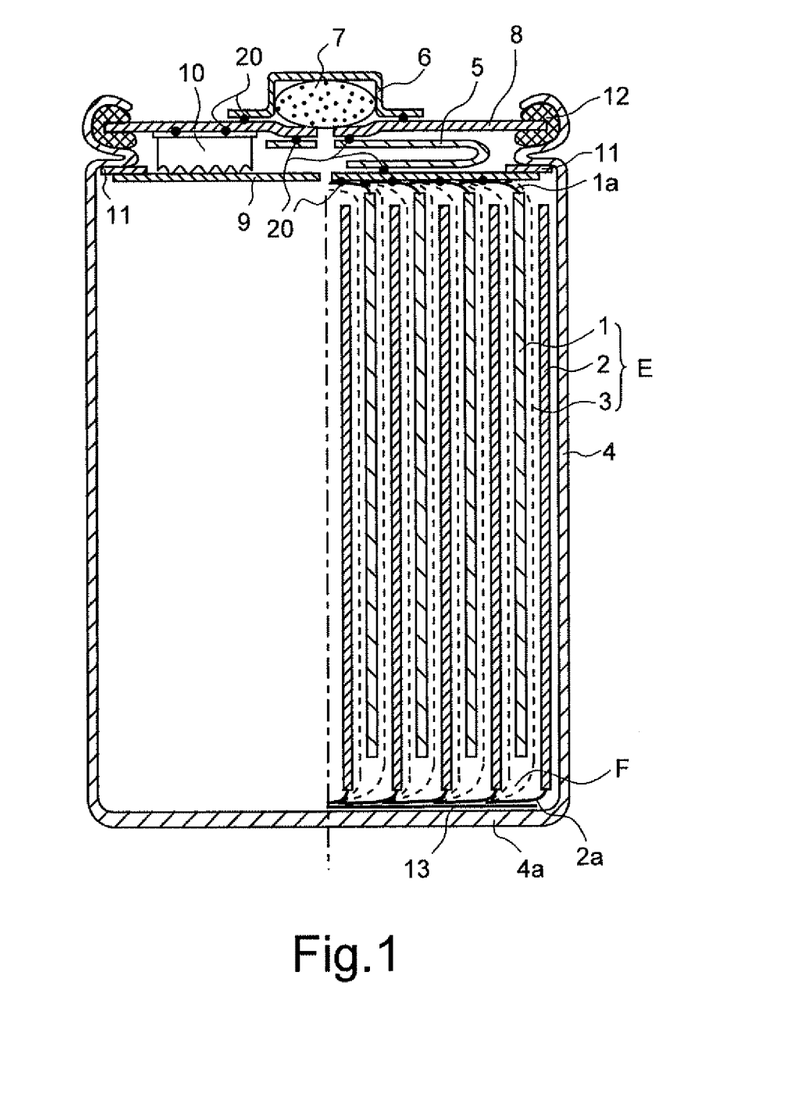
FIG. 1 is a schematic cross-sectional view of a Ni/MH battery according to one embodiment of the present invention.

Hereinafter, explanation on embodiments for carrying out the invention is made referring to drawings. FIG. 1 is a view showing the cross-sectional view of the cylindrical Ni/MH battery representing the present invention that has a spirally-rolled electrode group. There, as the generally used structure, an electrode group E in which a positive electrode 1 and a negative electrode 2 are spirally-rolled with a separator 3 interposed therebetween is contained in a bottomed cylindrical can 4. The metal exposure portion 1a of the positive electrode 1 is electrically connected to a cover body 8 with a metal lead plate 5 interposed that is electrically connected to a metal-made current collecting plate 9, while the metal exposure portion 2a of the negative electrode 2 is electrically connected to the bottom portion 4a of the bottomed cylindrical can with a metal-made current collecting plate 13 interposed.

The battery has a publicly known structure in which the bottomed cylindrical can 4 that is the negative terminal and the metal-made current collecting plate 9 of the positive electrode are insulated with an insulating ring plate 11, and the battery is sealed by a gasket 12 and a rubber valve body 7.

Here, although the metal exposure portions 1a and 2a of the positive electrode 1 and negative electrode 2 may have the existing structure in which the metal exposure portions 1a and 2a is spot-welded with perpendicularly contacting with the metal-made current collecting plates 9 and 13. In FIG. 1, the structure in which the metal exposure portions 1a and 2a of the positive electrode 1 and negative electrode 2 are bent together with the separator 3 thereby welded respectively to the metal-made current collecting plates 9 and 13 is shown as in the structure with improved reliability already proposed by the inventors (Japan unexamined laid-open patent publication 2006-12801). By this bending, a bag-like portion F is formed in the separator 3.

Figure 3:
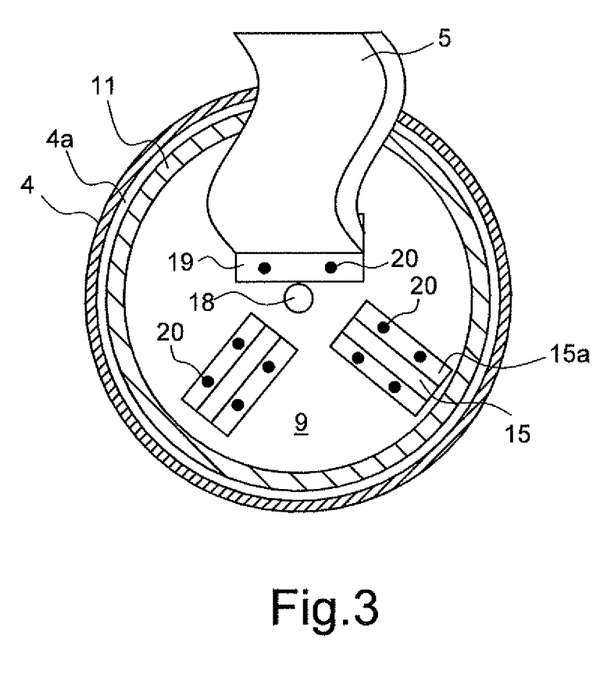
FIG. 3 is a schematic view of the upper portion of the electrode group before sealing in the Ni/MH battery according to one embodiment of the present invention.

The most important point in the present invention is that the characteristics are that the metal presser 10 is arranged between the metal current collecting plate 9 and the cover body 8 and that it is a pressurized state with the cover body 8 and the bottom portion 4a of the bottomed cylindrical can. As a result, by the reduction of contact resistance by pressurizing and by the electrical connection of the metal presser 10 in parallel to the metal lead plate 5, the internal impedance of the batteries is reduced. Also, the metal pressers 10 with the electrolyte resistance property are arranged radially from the center of the metal current collecting plate 9 to the vicinity of the resin-made insulating ring plate 11 as shown in FIG. 3 so that the pressure is applied evenly over the upper surface of the electrode group E. The metal presser 10 may have the electrolyte resistant property. For example, for Ni/MH batteries or Ni/Cd batteries, nickel or nickel-plated iron is preferable, and for Li secondary batteries, aluminum is preferable.

The metal presser 10 may be spot-welded or laser-welded to the metal exposure portion 1a of the positive electrode 1 or the metal-made current collecting plate 9 (the current collecting portion of the positive electrode). However, considering the practical application (for example, a method for producing), as shown in FIG. 1, the metal presser 10 is preferably spot welded or laser welded to cover body 8 is desirable. Here, 20 shows each welding point.

Figure 2A:
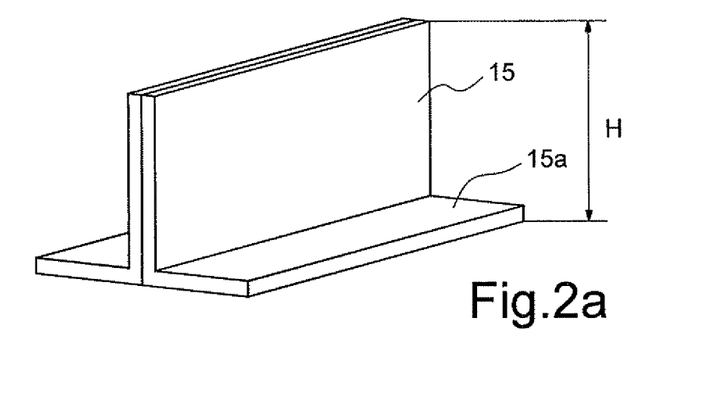
FIG. 2a is a perspective view showing one example of a metal presser.
Figure 2B:
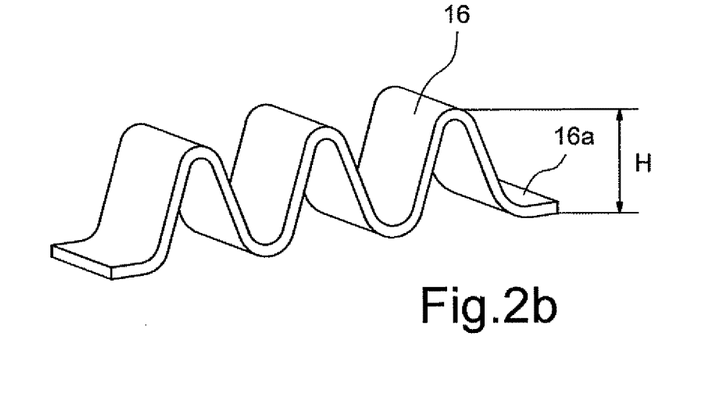
FIG. 2b is a perspective view showing one example of a metal presser.
Figure 2C:
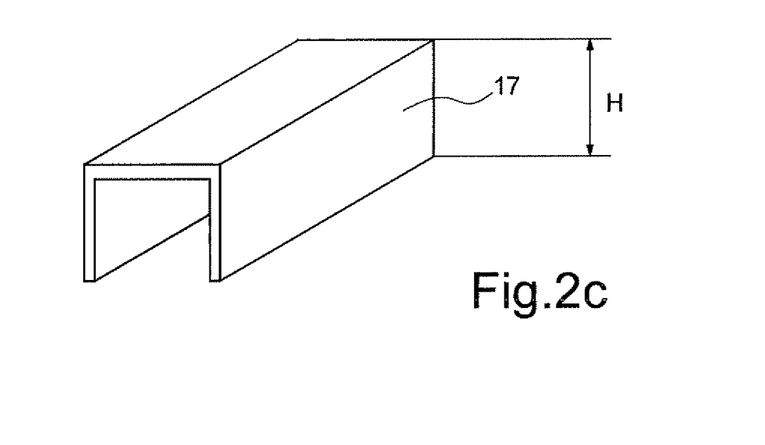
FIG. 2c is a perspective view showing one example of a metal presser.

In addition, considering the cost for materials, as shown in FIG. 2a, it is preferable that the metal presser is a narrow rectangle 15 with welding pieces 15a attached capable of spot-welding or laser-welding to the cover body 8 or the metal-made current collecting plate 9. In addition, as shown in FIG. 2b, the metal presser may either be wavy strip-shape provided with the welding pieces 16a on both sides or prismatic shape 17 with one surface opened as shown in FIG. 2c. Further, it is desirable that the height H of the metal presser 10 is higher by around 0.5 to 1.0 mm than the spatial distance between the cover body 8 and the metal-made current collecting plate 9. Moreover, regarding the number of the metal pressers to be used, either one or more agree the purpose of the invention. Also, although it is more desirable that the metal pressers are welded to either of nickel-made current collecting plate of the positive electrode or the bent metal exposure portion of the positive electrode or the cover body. However, it is satisfactory as long as appropriate pressure is applied (not less than 3 kgf/cm$^2$) with the cover body 8 and the can bottom portion 4a even if the metal pressers are not welded.

Figure 4:
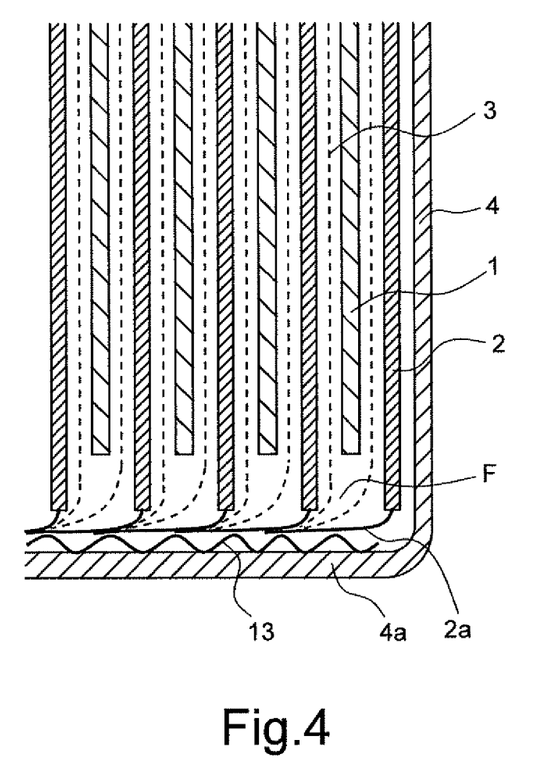
FIG. 4 is a schematic partial cross-sectional view showing the bottom portion of the Ni/MH battery according to another embodiment of the present invention.

In addition, in another embodiment shown in FIG. 4, with the wave-shaped metal-made current collecting plate 13 of the negative electrode, the internal impedance of the batteries is reduced by pressurizing.

The structure of the metal exposure portion 1a and the metal-made current collecting plate 9 of the positive electrode 1 and the connecting portion of the metal exposure portion 2a of the negative electrode and the can bottom portion 4a may employ conventional structure. However, in order to remove the risk of bulging the can bottom portion 4a by applying pressure of the cover body 8 and the can bottom portion 4a, it is desirable to employ such structures in which the distortion caused by the applied pressure is absorbed by bending the metal exposure portions 1a and 2a of the positive and the negative electrodes as shown in FIGS. 1 and 4 and by making each of the contact portions flexible using the porous plate for the metal-made current collecting plates 9 and 13 of the positive and negative electrodes. At the same time, using the bottomed cylindrical can 4 whose can bottom portion 4a is thicker than the side wall further removes this risk.

Example

Next, the examples of the present invention are explained.

Example 1

A mixture of generally used nickel hydroxide (Ni(OH)$_2$) powder and cobalt oxide powder with a weight ratio of 96:4 was kneaded with an aqueous solution of fluorine resin powder (1 wt. %) and carboxymethyl cellulose (0.3 wt. %), which was coated on an electrode substrate made of a three dimensional nickel foil (hereinafter called 3DF as in Japan unexamined laid open publication 2002-198055 already filed by the inventors). After dried, it was pressurized thereby obtaining a nickel positive electrode with an average filling density of 650 mAh and a thickness of 0.3 mm. Next, this electrode was cut into 43 mm in width and 910 mm in length, followed by removing the above mentioned coating material only by 4 mm in width along the long scale end surface of one side thereby forming a metal exposure portion and then, the positive electrode with a theoretical capacity of about 6.6 Ah processed for a cylindrical sealed D-sized battery with a diameter of about 32 mm was obtained.

The paste obtained by kneading the generally used MmNi$_5$ hydrogen absorbing alloy (Mm-(Ni—Co—Mn—Al)$_5$) powder with an aqueous solution of fluorine resin powder (1 wt. %) and carboxymethyl cellulose (0.3 wt. %) was coated on a 3DF electrode substrate and after dried, it was pressurized, thereby obtaining an alloy negative electrode with an average filling density of 1,500 mAh and a thickness of 0.18 mm. Next, after it was cut into 43 mm in width and 960 mm in length for the negative electrode of the above mentioned D-sized battery, the above mentioned coating material was removed only by 4 mm in width along the long scale end surface of one side, thereby obtaining a negative electrode with a theoretical capacity of about 10 Ah with a metal exposure portion formed.

These positive and negative electrodes are made into an electrode group E interposing a non-woven cloth made of polyolefin with a thickness of 0.11 mm, a width of 44 mm, and a length of 1,850 mm by constituting spirally by a generally used method. Next, the metal exposure portion of the positive electrode exposed to the upper surface of the electrode group E is bent in the center direction together with the separator, thereby conducting process as shown in 1a of FIG. 1. Next, the metal exposure portion of the negative electrode exposed to the lower surface of the electrode group is bent in the center direction together with the separator, thereby conducting process as shown in 2a of FIG. 1. For information, the positive electrode and the negative electrode have employed the structure in which they are vertically shifted by 1 to 2 mm respectively as shown in FIG. 1 in order to completely avoid the short circuit at the time of bending the metal exposure portion.

The nickel-made current collecting plates 9 and 13 are respectively spot-welded to the positive electrode and the negative electrode of the obtained electrode group and in the positive electrode side, the nickel-made metal lead plate 5 is further welded (welding point is 20). Next, after spot-welding the welding pieces 15a (2 pieces) of the electrolyte resistant metal presser 15 with a height H of 3.5 mm shown in FIG. 2a as shown in FIG. 3, they are inserted in the bottomed cylindrical can with a height of 52 mm and subsequently, after inserting a polypropylene-made insulation ring 11 therein, 13 cc of electrolyte whose main ingredient is generally used potassium hydroxide (KOH) with a specific gravity of about 1.3 is poured therein. For information, in order to facilitate pouring the electrolyte, at the center of the positive electrode current collecting plate 9, a perforated portion 18 that enables easy passing of the electrolyte is provided.

Next, after welding the positive electrode lead to the cover body, it is sealed by a generally used method with the cover body and the gasket 12, thereby obtaining a D-sized battery with a height of 51 mm.

Figure 5:
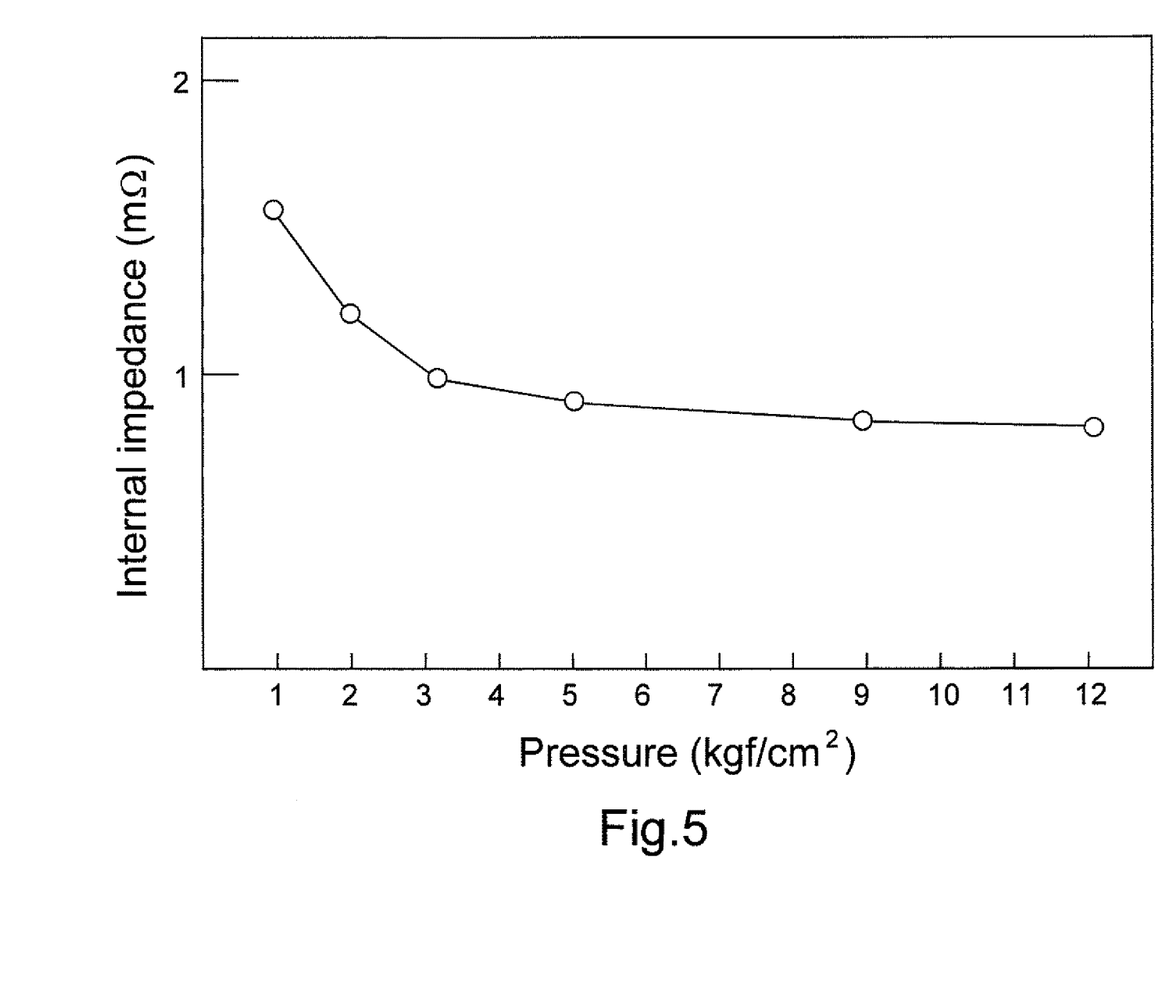
FIG. 5 is a graph showing the relationship between the internal impedance and the pressure of the cover portion and the can bottom portion of the Ni/MH battery of the Example 1 of the present invention.

After charging and discharging the obtained D-sized battery (theoretical capacity 6.6 Ah) two cycles under the condition of charge: 0.1 C, 100%, discharge: 0.2 C, end voltage 1.0 V, formation is completed followed by charging and discharging changing only charging to 120%. Next, after 120% of charging, the internal impedance (at 1 kHz) of the battery was measured. The relationship between the impedance and the pressing force when the pressing force was measured by the distortion of the can bottom portion 4a by changing the height of the metal presser H is shown in FIG. 5. Although when the pressing force is not less than 5 kgf/cm$^2$, the stable values were shown after the reduction in the internal impedance, the effect of reducing the internal impedance was acknowledged from not less than 3 kgf/cm$^2$.

Figure 6:
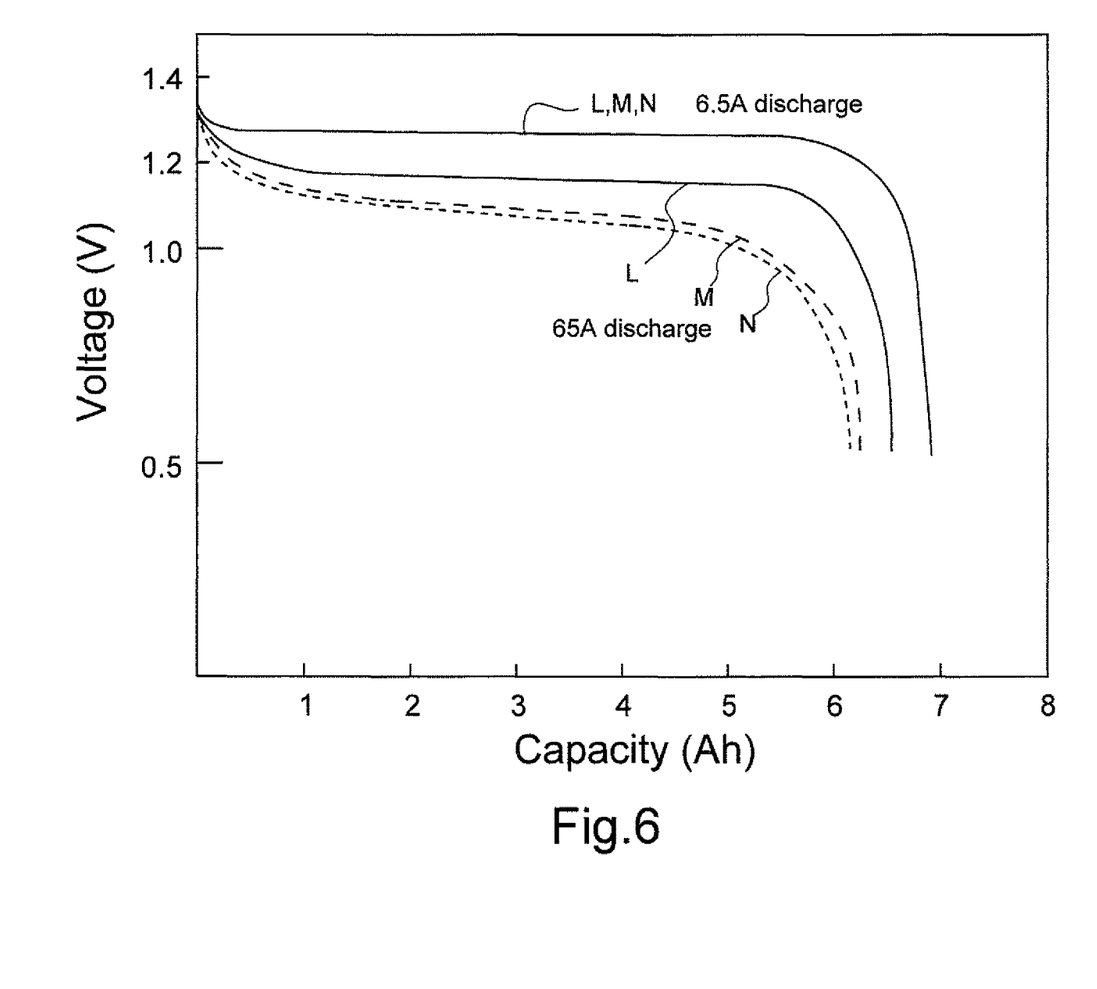
FIG. 6 is a graph showing the high rate discharge characteristics of the Ni/MH battery of the Example 1 of the present invention.

The average voltage was shown in FIG. 6 represented by L when 5 cells of the D-sized batteries with the height of 51 mm after the completion of the formation were discharged under the rate of 1 C (6.5 A) and 10 C (65 A). The middle voltage of 1 C showed 1.25V and the middle voltage of 10 C showed 1.18 V. As comparative examples, the average value M of the 5 cells with no metal presser 15 arranged and the average value N of the 5 cells with no metal presser 15 arranged and further without bending the exposure portion lead of the positive and the negative electrodes bent are shown in FIG. 6. It is found that in the voltage of 10 C discharge, L is extremely high compared with M and N and therefore it is suitable for high rate discharge. This result is considered to be caused by the great reduction in the internal impedance of the battery due to the reduced contact resistance between the cover body and the positive electrode and between the can bottom portion and the negative electrode by applying pressure to the electrode group at the cover body and the can bottom portion interposing this metal presser therebetween.

In addition, in the case of the battery N without bending the metal exposure portion lead of the positive and negative electrodes, among 8 cells manufactured as samples for a 5 cell test, 2 out of 8 cells showed micro short circuit. The reason is considered to be that the fallen-off materials of the active material powders of the positive electrode that is close to the can bottom portion contact with the current collecting plate of the negative electrode since the separator is not processed into bag-like.

Example 2

The welding pieces 15*a* of the metal presser with a height of 3.5 mm as shown in FIG. 2*a* in Example 1 are welded to the cover body that corresponds to the position shown in FIG. 3 and with the same structure and the same formation as in Example 1, D-sized batteries are obtained with a height of 51 mm. When 5 cells of these batteries were under 10 C discharge as described in Example 1, the similar voltage as in the case of L in Example 1 was obtained.

Example 3

Similar D-sized batteries are obtained by employing the similar structure as in Example 1 but without welding the metal-made current collecting plates 9 and 13 of the positive electrode 1 and the negative electrode 2 to the respective metal exposure portions. In this case, although the discharge voltage was very slightly reduced, it was much higher than M and N in Example 1 and rather it showed the value closer to L in Example 1.

Example 4

The structure with the similar electrode group and the metal presser arranged as in Example 1 was employed and instead of the bottomed cylindrical can with the constant thickness (0.5 mm), the bottomed cylindrical can with a thicker bottom portion (0.8 mm) and a thinner side wall (0.3 mm) was used as in shown in FIG. 4, thereby obtaining the similar D-sized batteries. In this case, the similar characteristics as L in Example 1 was obtained and the deformation of the can bottom portion by pressure was not at all observed.

As heretofore mentioned, by employing the nickel positive electrode provided with the metal presser of the present invention, the internal impedance of the battery can be reduced and therefore, the secondary battery with small voltage drop at high rate discharge and with excellent reliability that inhibits micro short circuit can be provided. In addition, the present application relates to the battery structure and the idea of the invention can be applied as it is to lithium secondary batteries or Ni/Cd batteries that employ spirally-rolled electrode group.

What is claimed is:

1. A secondary battery with an electrode group in which a positive electrode and a negative electrode are spirally-rolled interposing a separator therebetween contained in a bottomed cylindrical can, sealed by a cover body, and
   a metal-made current collecting plate electrically connected to a metal exposure portion provided on an end surface of the positive electrode of the electrode group and to the cover body by a metal lead plate, wherein the cover body functions as a positive electrode terminal,
   wherein one or more electrolyte resistant metal pressers are arranged between the metal-made current collecting plate and the cover body, wherein the metal-made current collecting plate and the cover body are electrically connected by the metal presser parallel to the metal lead plate.

2. The secondary battery with a spirally-rolled electrode group as set forth in claim 1, wherein the metal presser is welded to the contact portion to the metal-made current collecting plate and the contact portion to the cover body.

3. The secondary battery with a spirally-rolled electrode group as set forth in claim 1, wherein the metal presser is rectangular-shaped, strip-shaped, or wavy-shaped and electrically connected to the metal-made current collecting plate and to the cover body from the center of the spirally-rolled electrode group to the direction of an outer periphery.

4. The secondary battery with a spirally-rolled electrode group as set forth in claim 1, wherein the metal exposure portion of the positive electrode is bent to overlap toward the center direction of the electrode group.

5. The secondary battery with a spirally-rolled electrode group as set forth in claim 1, wherein the metal exposure portion is bent together with a part of the end surface of the separator.

6. The secondary battery with a spirally-rolled electrode group as set forth in claim 1, wherein the metal exposure portion of the positive electrode and the metal-made current collecting plate for the positive electrode are spot-welded or laser-welded.

7. The secondary battery with a spirally-rolled electrode group as set forth in claim 1, wherein pressure is applied by the cover portion and the bottom portion of the bottomed cylindrical can, and the applied pressure is not less than 3 kgf/cm$^2$.

8. The secondary battery with a spirally-rolled electrode group as set forth in claim 1, wherein the bottom portion of the bottomed cylindrical can is thicker than the side wall of the bottomed cylindrical can.

9. A secondary battery with an electrode group in which a positive electrode and a negative electrode are spirally-rolled interposing a separator therebetween contained in a bottomed cylindrical can, sealed by a cover body,
   a metal-made current collecting plate electrically connected to a metal exposure portion provided on an end surface of the positive electrode of the electrode group and to the cover body by a metal lead plate, wherein the cover body functions as a positive electrode terminal, and
   a metal-made current collecting plate electrically connected to a metal exposure portion provided on an end surface of the negative electrode of the electrode group and to the bottomed cylindrical can, wherein the bottom cylindrical can functions as a negative electrode terminal, wherein one or more electrolyte resistant metal pressers are arranged between the metal-made current collecting plate and the cover body, wherein the metal-made current collecting plate and the cover body are electrically connected by the metal presser parallel to the metal lead plate, wherein the metal-made current-collecting plate of the negative electrode and the bottom portion of the bottomed cylindrical can are electrically connected by pressure contact or welding, and wherein the electrode group is in a state of applied pressure by the cover body and the bottom portion of the bottomed cylindrical can.

10. The secondary battery with a spirally-rolled electrode group as set forth in claim 9, wherein the metal exposure portion of the negative electrode is bent to overlap toward the center direction of the electrode group.

11. The secondary battery with a spirally-rolled electrode group as set forth in claim 9, wherein the metal exposure portion of the negative electrode is bent together with a part of the end surface of the separator.

12. The secondary battery with a spirally-rolled electrode group as set forth in claim 9, wherein the metal exposure portion of the negative electrode and the metal-made current collecting plate for the negative electrode are spot-welded or laser-welded.

13. The secondary battery with a spirally-rolled electrode group at set forth in claim 9, wherein the pressure by the cover portion and the bottom portion of the bottomed cylindrical can is not less than 3 kgf/cm$^2$.

14. The secondary battery with a spirally-rolled electrode group as set forth in claim 9, wherein the bottom portion of the bottomed cylindrical can is thicker than the side wall of the bottomed cylindrical can.

* * * * *

UNITED STATES PATENT AND TRADEMARK OFFICE
CERTIFICATE OF CORRECTION

| | | |
|---|---|---|
| PATENT NO. | : 8,557,410 B2 | Page 1 of 1 |
| APPLICATION NO. | : 12/550637 | |
| DATED | : October 15, 2013 | |
| INVENTOR(S) | : Isao Matsumoto et al. | |

It is certified that error appears in the above-identified patent and that said Letters Patent is hereby corrected as shown below:

On the Title Page, Column 2, Item (56) References Cited, Other Publications, Line 5, delete "Hybride" and insert -- Hydride --

In the Claims

Column 10, Line 10, Claim 13, delete "at" and insert -- as --

Signed and Sealed this
Eleventh Day of February, 2014

Michelle K. Lee
*Deputy Director of the United States Patent and Trademark Office*